(12) United States Patent
Dunton

(10) Patent No.: US 11,243,690 B1
(45) Date of Patent: Feb. 8, 2022

(54) ADAPTABLE TOUCHSCREEN KEYPADS WITH DEAD ZONE

(71) Applicant: Agilis Eyesfree Touchscreen Keyboards Ltd., Abbotsford (CA)

(72) Inventor: Herbert James Dunton, Abbotsford (CA)

( * ) Notice: Subject to any disclaimer, the term of this patent is extended or adjusted under 35 U.S.C. 154(b) by 0 days.

(21) Appl. No.: 17/417,683

(22) PCT Filed: Jan. 29, 2021

(86) PCT No.: PCT/CA2021/050109
§ 371 (c)(1),
(2) Date: Jun. 23, 2021

Related U.S. Application Data

(60) Provisional application No. 63/056,191, filed on Jul. 24, 2020.

(51) Int. Cl.
*G06F 3/0488* (2013.01)
*G06F 3/16* (2006.01)
*G06F 3/01* (2006.01)

(52) U.S. Cl.
CPC .......... *G06F 3/04886* (2013.01); *G06F 3/016* (2013.01); *G06F 3/167* (2013.01)

(58) Field of Classification Search
USPC ........................................................ 715/773
See application file for complete search history.

(56) References Cited

U.S. PATENT DOCUMENTS

| | | | |
|---|---|---|---|
| 7,057,607 B2 | 6/2006 | Mayoraz et al. | |
| 7,479,949 B2 | 1/2009 | Jobs | |
| 2005/0210402 A1* | 9/2005 | Gunn | G06F 3/0236 715/773 |
| 2005/0270269 A1 | 12/2005 | Tokkonen | |
| 2006/0028450 A1 | 2/2006 | Suraqui | |
| 2006/0085757 A1 | 4/2006 | Andre | |
| 2007/0040813 A1* | 2/2007 | Kushler | G06F 3/04883 345/173 |
| 2007/0152978 A1 | 7/2007 | Kocienda | |
| 2009/0146957 A1 | 6/2009 | Lee | |
| 2009/0237359 A1 | 9/2009 | Kim | |
| 2010/0251176 A1 | 9/2010 | Fong | |
| 2010/0333011 A1 | 12/2010 | Kornev | |
| 2011/0074692 A1 | 3/2011 | Causey | |
| 2011/0210850 A1 | 9/2011 | Tran | |
| 2011/0215954 A1 | 9/2011 | Page | |
| 2012/0030606 A1 | 2/2012 | Zhang | |
| 2012/0328349 A1 | 12/2012 | Isaac | |
| 2013/0113714 A1 | 5/2013 | Mao | |
| 2013/0120271 A1 | 5/2013 | Lee | |
| 2013/0215037 A1 | 8/2013 | Mao | |
| 2017/0052702 A1 | 2/2017 | Norris | |
| 2017/0242550 A1* | 8/2017 | Shibata | G06F 3/0233 |

* cited by examiner

*Primary Examiner* — Henry Orr

(57) ABSTRACT

After the user touches anywhere within a designated "group key" area of multiple characters or functions on the touch screen keyboard, a "keypad" is created that is centered around the user's touch. The keypad has the same layout of characters and functions as the group key, but the keypad moves as necessary from the location of the group key to re-centre at the point of the user's touch. Maintaining the touch, the user swipes a fingertip from a central dead zone on the keypad to one of the keys to select it. Audio and haptic indicators may also be provided. The keyboard may be active without being displayed.

54 Claims, 5 Drawing Sheets

ADAPTABLE TOUCHSCREEN KEYPADS WITH DEAD ZONE

TECHNICAL FIELD

This application relates to data entry using a touchscreen. More specifically, it relates to data entry or function selection using a touchscreen keyboard with adaptable or moving keypads.

BACKGROUND

Data entry by use of a touchscreen has had the inherent challenge of providing no tactile measure or response by which a person can be sure that the right key has been engaged when the smooth-surfaced screen is touched. Compounding this challenge has been the factor that many touchscreen devices, as for instance on mobile telephones, are small with tiny keys.

As a result, a person entering data has had to visually observe the touchscreen while entering data to be sure that the correct keys are selected. These difficulties have made data entry through touchscreen devices generally slower and more error-prone than through mechanical keyboards. What we do now with a mechanical desktop keyboard is essentially to pass our fingers over the keyboard and tap or depress the desired key, which provides tactile feedback. This can be done without looking, however, a touchscreen keyboard usually needs to be looked at in order to select the correct key.

In addition, visually impaired people may not be able to use smooth-surfaced touchscreens for keyboarding on electronic devices efficiently, without assistive technology. Touchscreens now have widespread and still growing acceptance in a wide range of applications. There have also been numerous attempts to make data entry through the use of touchscreens more efficient.

U.S. Patent Application No. 2011/0210850 to Tran discloses a touchscreen keyboard for small mobile devices that improves typing accuracy and speed by using directional swipes to select letters or symbols in combination keys containing multiple letters or symbols per key.

U.S. Patent Application No. 2013/0215037A1 to Mao embodies a two-handed keyboard interface for an electronic device with a multi-touch surface. The location of the pads with the keys is positioned in such a way that each pad is operable by a different one of the user's ten fingertips.

U.S. Patent Application No. 2013/0113714A1 also to Mao embodies a one-handed keyboard interface for an electronic device with a multi-touch surface. The location of the pads with the keys is positioned in such a way that each pad is operable by a different fingertip of the same hand.

This background information is provided to reveal information believed by the applicant to be of possible relevance to the present invention. No admission is necessarily intended, nor should be construed, that any of the preceding information constitutes prior art against the present invention.

SUMMARY OF INVENTION

The invention described herein relates to a device and method for entering data or values into a computing device, and selecting a function capable of being performed by a computing device, by the use of a smooth-surfaced touchscreen.

The point of touch on a touchscreen, which could be anywhere within a "group key" that is typically several times larger than a normal single key, becomes the centre of a "keypad" formed from the keys in the group key. It does not matter where the touch is within the designated area of the group key, as the user's point of the first touch becomes the centre of the keypad. In other words, the keypad relocates as directed by the user from the location of the group key to centre at the point of the user's fingertip touch. Once the keypad is displayed, the user swipes towards the particular key of interest, which is registered either when the fingertip reaches it or when the fingertip is lifted from it.

Depending on the embodiment of the invention, a user of the touchscreen keyboard disclosed herein may be provided with one or more of the following advantages. The keyboard may provide a greater accuracy rate when typing compared to static keyboards. Static keyboards are those in which the keys are laid out in a fixed arrangement and do not move during use of the keyboard. The keyboard may also allow the user to type at greater speeds compared to some static keyboards, particularly small ones. It will be possible for some users not to look at the touchscreen when typing, allowing for touch-typing, or eyes-free function selection or data entry. As the keypad and its constituent keys come to the user's fingertip, rather than the user having to place a fingertip precisely on a key in an initial action, smaller displacements of the fingertips from key to key may be possible than if a static keyboard were being used.

Disclosed herein is a touchscreen configured to: define a keyboard on the touchscreen; define a group key within the keyboard, wherein the group key represents multiple functions; detect a touch on the touchscreen within the group key; define a keypad on the touchscreen, the keypad comprising a dead zone at a point of the touch and keys adjacent to the dead zone, each key corresponding to a different one of the functions; detect a swipe of the touch from the dead zone to one of the keys; and perform the function corresponding to said one key.

Also disclosed is an electronic device comprising: a touchscreen; a memory storing computer readable instructions; and a processor connected to the memory and the touchscreen; said computer readable instructions configured, upon processing by said processor, to cause the device to: define a keyboard on the touchscreen; define a key group within the keyboard, wherein the key group represents multiple functions; detect a touch on the touchscreen within the key group; define a keypad on the touchscreen, the keypad comprising a dead zone at the point of the touch and keys adjacent to the dead zone, each key corresponding to a different one of the functions; detect a swipe of the touch from the dead zone to one of the keys; and perform the function corresponding to said one key.

Further disclosed is a method for receiving an input to a touchscreen, the method comprising: defining, by a processor, a keyboard on the touchscreen; defining, by the processor, a group key within the keyboard, wherein the group key represents multiple functions; detecting, by the processor, a touch on the touchscreen within the group key; defining, by the processor, a keypad on the touchscreen, the keypad comprising a dead zone at a point of the touch and keys adjacent to the dead zone, each key corresponding to a different one of the functions; detecting, by the processor, a swipe of the touch from the dead zone to one of the keys; and performing, by the processor, the function corresponding to said one key.

BRIEF DESCRIPTION OF DRAWINGS

The following drawings illustrate embodiments of the invention and should not be construed as restricting the scope of the invention in any way.

DESCRIPTION

A. Glossary

Function—as used herein relates to anything that occurs when a key is selected. For example, a function may be the registration of a character such as a number, letter, smiley, punctuation mark, etc. A function may also be the implementation of an operation such as changing the keyboard between upper and lower case, deleting a character, starting a new line, entering data, switching to a different level, etc.

Group key—a single key for a group of functions, for which symbols may or may not be displayed on the group key. In either case, the group key is an active surface having a designated area, such that when it is selected, a keypad is created with individual active keys for each of the functions in the group key. In at least one mode (the normal mode) of the keyboard, individual functions corresponding to the symbols in the group key cannot be selected directly from the group key.

Keypad—a group of active keys defined on a touchscreen. The keys may be displayed or not displayed, but in either case they are active, in that each key of the group may be selected and its corresponding function invoked by a user swiping a fingertip to the key. The keypad is essentially the group key relocated to centre on the user's point of touch, and having the individual keys activated.

Level—refers to a particular set of functions that can be activated by the keyboard. For example, one level of the keyboard may have the set of Latin characters, another level may have accentuated Latin characters, and another level may have Greek letters.

Symbol—this may refer to a character such as a number, letter, smiley, punctuation mark, etc, or it may represent a non-character function such as an operation that a device performs, and may be a word or an abbreviation. Symbols may be displayed on the group keys and the keypads.

B. Exemplary Embodiments

Figure 1:
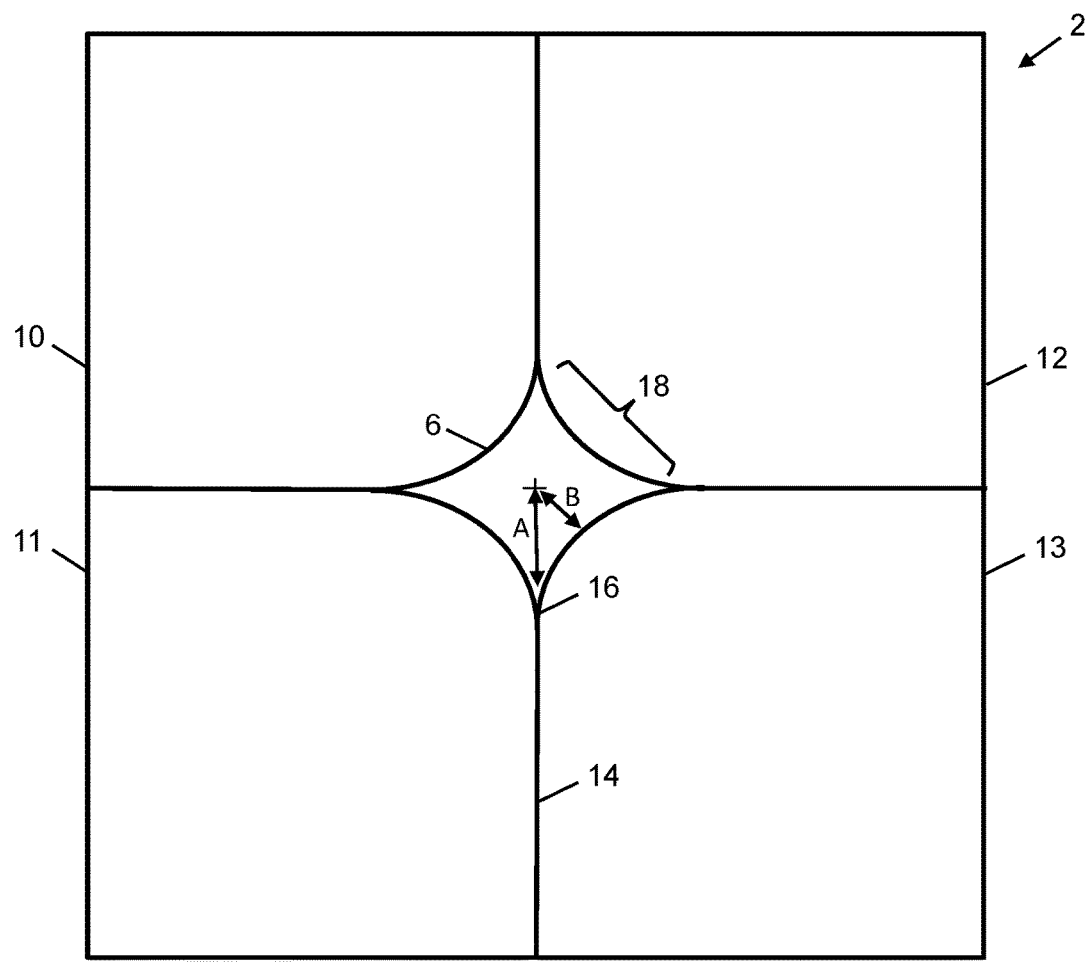
FIG. 1 is a drawing representing a keypad according to an embodiment of the present invention.

Referring to FIG. 1, there is shown a keypad 2 with a dead zone 6 in its centre. The keypad 2 is created when the user touches the keyboard. The dead zone 6 is an area around and under the user's point of touch, which is adjacent to keys 10, 11, 12, 13, each representing a function. The keys 10, 11, 12, 13 are arrayed around the dead zone 6, i.e. they are distributed evenly around the dead zone. The dead zone 6 does not result in the implementation of a function when it is touched, and the user's touch may be moved around in the dead zone without selecting a function. To select a function, the user swipes the touch to one of the keys 10, 11, 12, 13 in the keypad 2, and then lifts the touch. Alternately, the function registers when one of the keys 10, 11, 12 and 13 is first touched by the swipe reaching it. Whichever of these ways is employed to select a function depends upon a setting chosen by the user, in embodiments where both options are provided. Upon lifting of the touch, or upon first touch of a key, the corresponding function is registered by the device that is controlled by the keyboard of which the keypad 2 is part.

There is a boundary between each pair of adjacent keys, for example boundary 14 between the two adjacent keys 11 and 13. The shortest distance A between the boundary 14 at point 16 and the centre of the dead zone 6 is greater than the shortest distance B between the key 13 and the centre of the dead zone. This means that the swipe needs to be longer to accidentally select an incorrect adjacent key (e.g. by swiping in a direction that is away from the centre of the intended key) than to select an intended key. This does not apply to swiping deliberately to the wrong key in the belief that it is the correct one.

In some embodiments the boundary between adjacent group keys or individual keys within a keypad may be broader to provide greater distinction between group keys or keys respectively. In some embodiments these boundaries may be an extension of the dead zone, as an additional safeguard against engaging an unintended key. In some embodiments if the user's touch straddles two group keys, then the group key on which the larger area of touch falls will engage its corresponding keypad.

In some embodiments, as a further protection against inaccurate directional swipes, the size of the dead zone 6 may be larger. In other embodiments, it may be adjusted by a user, to make it larger or smaller, as best suited to an individual user's dexterity. If the dead zone 6 is made larger, then the width of the closest edge of the 'target', being a key 10, 11, 12, 13 sought to be engaged, is made wider, and thus easier to find and harder to miss. For example, edge 18 of key 12 may be considered to be the target. The target edge 18 of a key is shaped with a curve, as shown, but it may also be a straight line in other embodiments and still provide the same difference advantage between distances A and B, as the gear-shaped cogwheel of dead zone 6. The dead zone 6 is configured as a gear-shaped cogwheel, with each of its sides being concave. In other embodiments, different gear-shaped cogwheels could be used, that have the cogs of the wheel extending up the boundary between each two adjacent keys, similar to the cogwheel of dead zone 6, yet still providing the difference between distances A and B.

Figure 2:
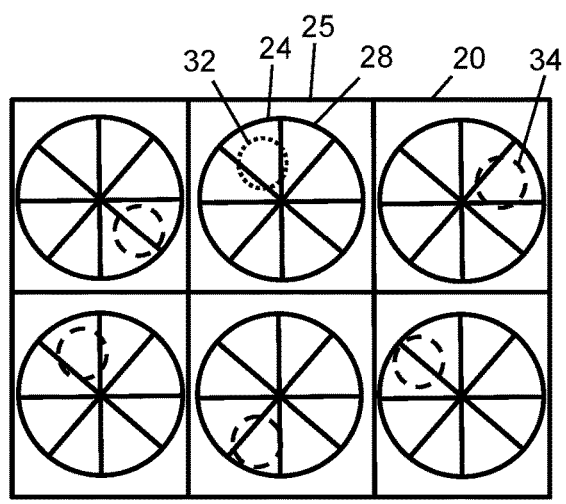
FIG. 2 is a drawing representing a keyboard according to an embodiment of the present invention.

Referring to FIG. 2, there is shown a keyboard or radial keyboard 20 with 6 groups of different functions, the keyboard being present on a touchscreen. For example, one group of functions, group key 24, has a pie-shape divided into 8 equal sections such as section 28, each section representing a different function. Each section 28 may be defined as a non-active key, since the function it represents is not immediately selectable by tapping it. Each section from a group key 24 of functions has a character, a punctuation mark, a number or any other appropriate symbol displayed in it, for example. In some embodiments, each section 28 of a keypad may not have the same size, shape, dimensions, or colour.

The circle 32 in FIG. 2 represents an example of a location where the user touches the screen with a fingertip in order to select any function from the group of functions in the group key 24. In one embodiment, the user may need to touch within the circular, designated area of the group key 24 to select the key group. In another embodiment, the user may be able to touch a larger box 25 around the group key 24 to select it. The division of the keyboard 20 into 6 areas, each larger than an individual section 28 and each with a group of functions, allows some users to select the groups of functions, i.e. group keys, without looking at the screen after several uses. Indeed, the user's finger is not likely to hit the centre of an intended key on a smooth touchscreen with a traditional keyboard, unless the user is looking at the screen. However, the user may, without looking, accurately hit anywhere within a larger section 24, 25 of the screen of such groups of functions. Other circles 34 show examples of other suitable places where a user may touch the keyboard 20, each within a different group key.

Figure 3:
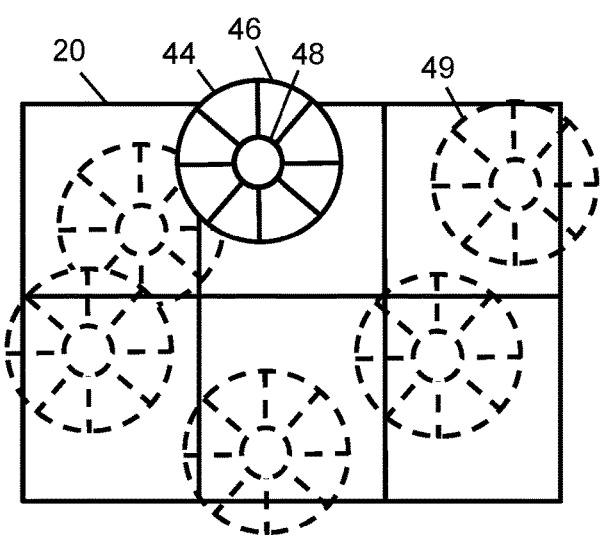
FIG. 3 is a drawing representing the keyboard of FIG. 2 showing examples of different positions of the keypads, according to an embodiment of the present invention.

Referring to FIG. 3, there is shown the same keyboard 20 with keypad 44, which is activated by the user's touch 32 (FIG. 2). The keypad 44 is centred around the user's touch 32, and is the same size as the group key 24. In other embodiments, the keypad is larger or smaller than the corresponding group key. The dead zone 48 of the keypad 44 has a location on the keyboard which is the same as the user's touch 32. Key 46 is an active key that corresponds to the function represented by non-active key or section 28 (FIG. 2). Other keypads 49 which may be created or displayed are centred around the other user's touches 34 from FIG. 2. The dead zones of the keypads 49 have positions at the location of the user's touches 34. Therefore, no matter where a user touches a keyboard, that point becomes the centre of a pre-determined keypad, the shape of which may be modified if close to the edge of the touchscreen. Note that in this embodiment, the shape of the dead zone is circular, so that there is no difference in the distances from the centre of the dead zone to a key and to a boundary between two keys. As a result, there is less margin for error than if the dead zone were shaped with concave edges, as in FIG. 1.

Each one of the six keypads such as keypad 44 has 8 keys. Any of the 8 keys is selected by a swipe of a finger from the dead zone 48, out along one of the spokes or radials towards a particular key such as key 46. Because the keypads will centre on where the user's finger touches the screen, users can be relatively rough in terms of where they strike the screen to type a character, particularly in comparison to traditional touchscreen keyboards. The user does not have to hit the centre of the non-active key (e.g. section 28) exactly, or even close to the centre. The desired keypad will effectively move from the position of the group key and re-centre at the point where the user's finger touches the screen. Wherever the user's finger strikes the touchscreen keyboard, within a designated area of the screen larger than a non-active key (e.g. section 28), the keys associated with that designated area of the screen will be displayed in a keypad, centred around the point where the user's finger touches the screen.

The key, which is sought to be selected by a user, comes in its group towards the user's fingertip, instead of users being bound to find and move their fingertips to a pre-determined, fixed key location. In this way, users may be freed from having to look at a smooth-surfaced touchscreen when entering data, in order to select the correct key. The key moves towards the user's fingertip, not vice versa. In this way, the risk of missing the intended key is minimized. This keyboard has a tap and slide system and is, in a way, the opposite of a traditional mechanical keyboard, which is, or may be considered, slide and tap. In some embodiments, the user does not have to slide the finger as far to get to the key on the keyboard disclosed herein, as compared to a desktop mechanical keyboard.

While this keyboard is characterized for descriptive purposes as "tap and slide" or "touch and swipe," in fact, the selection of a function is accomplished by one continuous gesture, the user's first contact with the screen when making a swipe being considered the "tap" or "touch" element of the single gesture. The user's first touch creates the keypad instantaneously, and the user continues in a swiping gesture towards the selected key, all in one continuous uninterrupted motion.

Once users learn the layout of the keyboard 20, the more adept users can type without looking at the screen. As long as a user touches the touch-screen anywhere within one of the group keys 24 (which may be an area as large as one of the six boxes 25), the eight keys related to that keypad will re-centre at the point the finger strikes the screen. So, the key moves to the point where the finger strikes the screen. That way, the user has a much greater allowable margin of error as to where to strike the keyboard. The user can essentially miss the centre of their intended strike point (e.g. the centre of the group key 24) by a fairly wide margin, yet still be centred on the resulting keypad 44, because the keypad will re-centre itself (relative to the group key) to the point 32 where the finger touches the screen 20. The user can then swipe from that dead zone 48 outward along one of the eight radial directions towards the keys they wish to type or select.

The length of the swipe the user takes along one of the eight radial directions is, in one embodiment, about 0.6 cm (¼ inch), and there is a considerable margin for error in the direction of the swipe. Each of the keys 46 arranged around the dead zone 48, is assigned a sufficient segment of the 360 degrees of a circle, so that missed or inaccurately directed swipes become unlikely. As long as the finger is swiped in a direction within 22.5° either side of the desired radial direction (a 45° margin of error), the desired key is struck (i.e. selected) and the desired function is activated. The act of selecting one key from a pre-assigned group of keys and entering a character or function command, is completed by a short directional swipe beginning from the dead zone, the location of the dead zone being established by the user's point of touch, and continuing the directional swipe towards the one key to be selected.

In other embodiments, other keyboards have different portions of the circle allocated to each key. For example, a keypad with 6 keys would each have 60° assigned and a keypad with 4 keys would each have 90° assigned. Other numbers of keys in a keypad are possible, with each key in a keypad having an equal corresponding segment of the 360° circle, or unequal segments in some embodiments.

The action of engaging the desired key and selecting (or entering) the desired function is completed either when the directional swipe reaches the selected key, or alternatively in accordance with an option, when the user's fingertip is lifted from the selected key. Therefore this allows for somewhat imprecise fingertip positioning, since the user entering data only needs to find and touch a larger designated area of a screen, rather than finding and touching a small key. In this way, some users may not need to look at a touchscreen to find small keys, in order to ensure accurate data entry, as is required with many keyboards now in use.

In some embodiments, a touchscreen is divided into fewer and larger designated areas, and a group of keys is pre-assigned to each designated area. Then, when a user touches the screen in one of the designated areas, at whatever point within that designated area the person's fingertip touches, that point becomes the dead zone of the group of keys, the keypad. In some embodiments, the geometry, size, shape, dimensions, colour, and/or design of the designated areas are customizable by the user. The keyboard may be operated using a user's two most dominant fingers or thumbs, or more digits as the user wishes.

Figure 4:
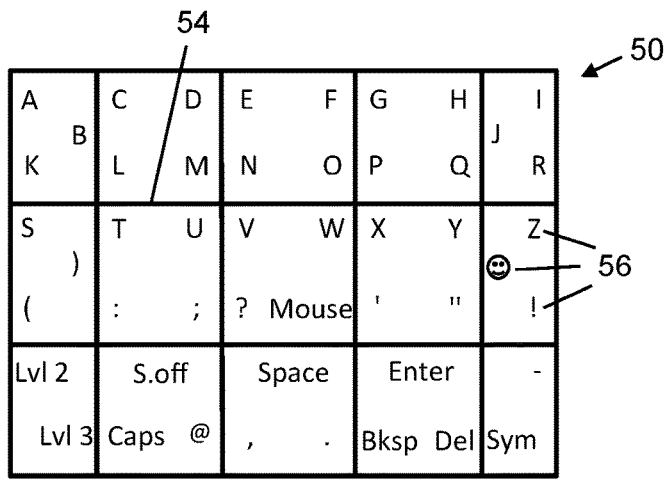
FIG. 4 is a drawing representing a keyboard according to an embodiment of the present invention.

Referring to FIG. 4, there is shown a keyboard 50 with 15 different groups of symbols 56 such as the group key 54 with the following characters: T, U, a colon and a semicolon. The characters in the group keys 54 are mostly capitalized letters. In some embodiments, the characters are not displayed on the keyboard, which displays only the 15 group key boundaries or areas. The user may learn the location of each character in every group key 54 on the keyboard 50 after several uses. In some embodiments, the layout of the keyboard 50 is organized in such a way that it is logical and easier to learn than a QWERTY keyboard. For example, the letters are in alphabetical order, and the numbers are displayed in a logical order. For example, if the user knows where the A is, the user is able to deduce where the letters 'B', 'C', and 'D', etc., are.

In some embodiments, the number, size, shape, colour and shape of the group keys 54 vary. In some embodiments, the size, font and colour of the symbols 56 are customizable by the user. In some embodiments, the layout of the keyboards and the organization of the symbols 56 inside the group keys 54 vary. In some embodiments, some of the symbols 56 may be alphabetical characters, roman numbers and punctuation symbols, or may be words or abbreviations corresponding to operational functions of the device of which the keyboard 50 is a part or that the keyboard controls, or corresponding to terms used in a particular trade or practice.

Figure 5:
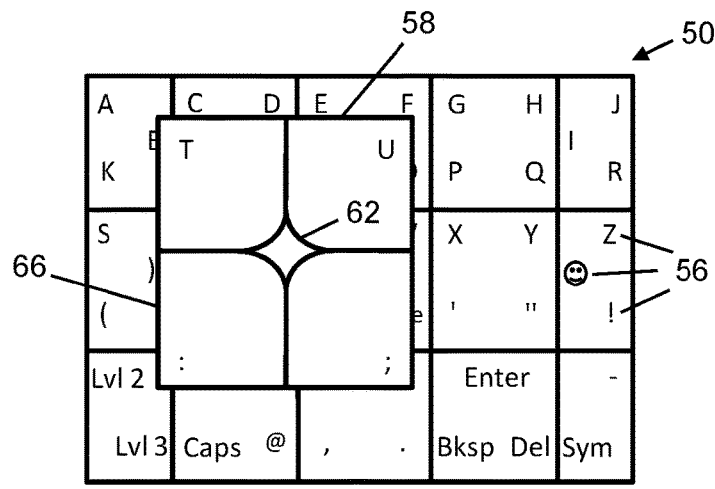
FIG. 5 is a drawing representing the keyboard of FIG. 4 with a selected keypad, according to an embodiment of the present invention.

Referring to FIG. 5, there is shown the keyboard 50 with the same 15 different groups of symbols 56 as in FIG. 4. The keypad 58 created from the group key 54 from FIG. 4 includes a dead zone 62 and 4 adjacent keys such as key 66. The keypad 58 has a square shape. In some embodiments, the size, the shape, the colours, and the orientation of the keypad 58 is different. In some embodiments, the number of keys per keypad 58 varies. Users are able to configure the arrangement, the visual aspect and the organization of the keypad 58 depending on their preference, visual acuity and/or his ability to perceive colour and shape.

Figure 6:
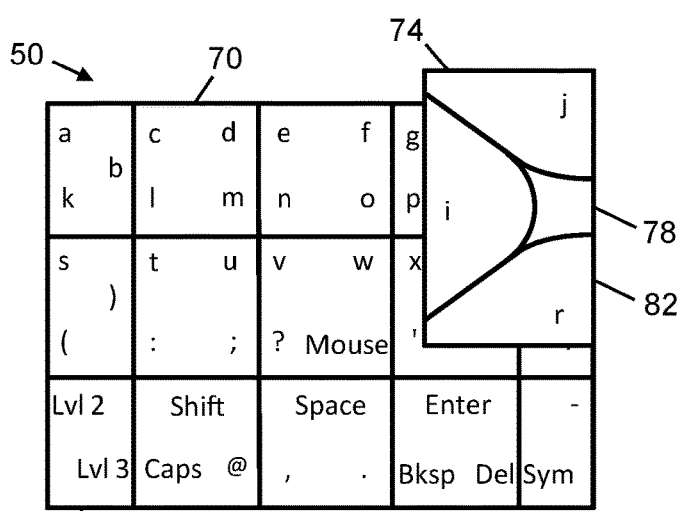
FIG. 6 is a drawing representing the lower-case mode of the keyboard of FIG. 4 with a selected keypad, according to an embodiment of the present invention.

Referring to FIG. 6, there is shown the lower-case mode 70 of keyboard 50, displaying the lower-case characters. A keypad 74 created from a group key of the keyboard displays dead zone 78 with 3 keys such as the key 82 with the character r. The dead zone 78 in the keypad 74 has a gear-shape that is truncated by the right edge of the touchscreen available for the keyboard 50. As an additional protection against inaccurate directional swipes, the dead zone 78 of the keypad 74 is designed in a gear-shape of concave arcs, which further decreases the likelihood of missed directional swipes or the selection of an unintended key, by making the length of the swipe required to reach the intended key shorter than the length of swipe required to reach an unintended key or a zone of uncertainty near the boundary of neighbouring keys.

Figure 7:
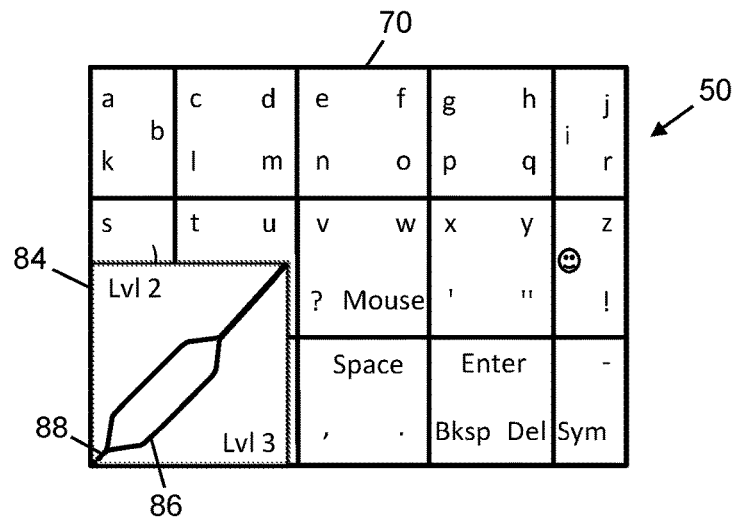
FIG. 7 is a drawing representing the keyboard of FIG. 6 with a different keypad selected, according to an embodiment of the present invention.

The levels are simple to switch back and forth between. For example, by selecting the group key 80, the current Level 1 of the keyboard 50 may be switched to either Level 2 (Lvl 2) or Level 3 (Lvl 3). Referring to FIG. 7, there is shown the first level 70 of the keyboard 50 with the 15 different groups of mostly lower-case characters. The keypad 84, created when the user touches the group key 80, has two keys each with a character (Lvl 2, Lvl 3), and a dead zone 86 which has an elongated hexagonal shape. The keypad 84 has a square shape, and displays slightly off-centre from the user's touch in order to fit within the display area of the touchscreen available to the keyboard. Even though keypad 84 displays off-centre to the dead zone, the dead zone is still located at the location of the landing touch of the user's fingertip, and stands equi-distant from the Lvl 2 and Lvl 3 keys. The dead zone 86 is aligned along a diagonal 88 of the keypad 84. The boundary between the two keys is aligned along the diagonal 88 of the keypad 84.

As there is no particular limit on the number of levels to this keyboard, the characters of any other language and even logographic writing systems with their thousands of characters could be incorporated. Extrapolating from this, any number of letters, numbers, characters, symbols, words, abbreviations, or computer functions can be accessed in this keyboard 50.

Figure 8:
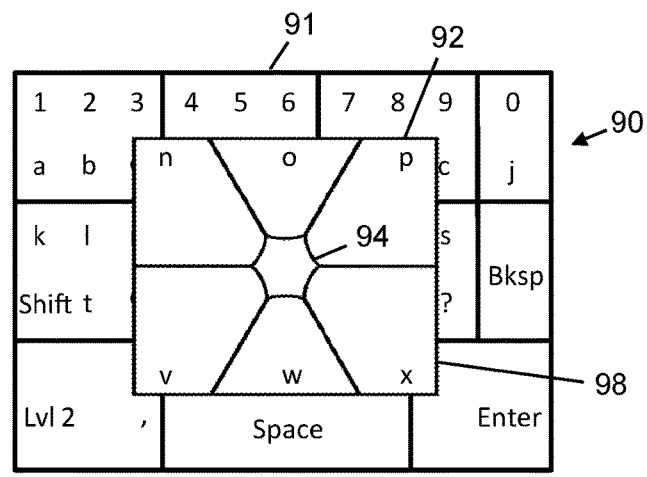
FIG. 8 is a drawing representing another keyboard with a selected keypad, according to an embodiment of the present invention.

Referring to FIG. 8, there is shown a keyboard 90 with 11 different group keys 91. The organization of the characters is such as to display in the first line of the keyboard 90 a series of numbers. The keypad 92 has in its centre a dead zone 94, which is surrounded by 6 keys such as key 98. Each one of these 6 keys displays a character from the group key previously touched by the user. The dead zone 94 is hexagonal, with concave sides.

Figure 9:
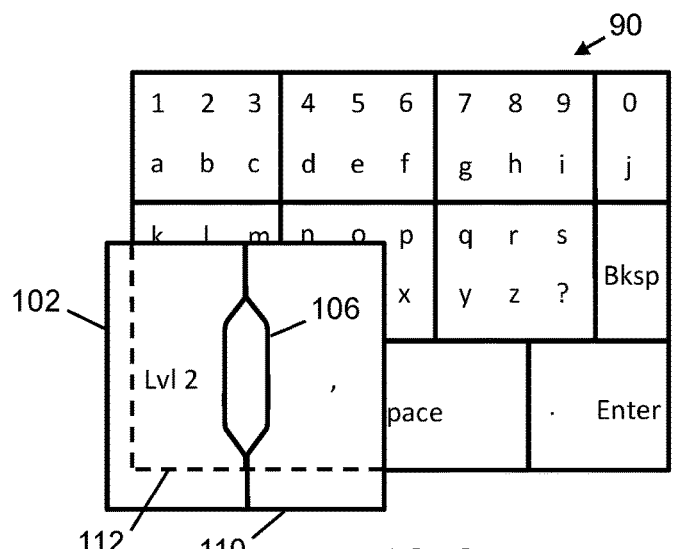
FIG. 9 is a drawing representing the keyboard of FIG. 8 with a different keypad selected, according to an embodiment of the present invention.

Referring to FIG. 9, there is shown the same keyboard 90 as in FIG. 8. The keypad 102 created after the user touches a group key with two characters (Lvl 2, comma) has a dead zone 106 with an elongated hexagonal shape. The dead zone 106 is positioned at the centre of the keypad 102 with the two keys, such as key 110, separated by a boundary along a vertical axis. The keypad 102 is shifted slightly outside the boundary 112 of the set of group keys, as there is sufficient area of the touchscreen available there in some embodiments for its display. In some embodiments there may be no boundary area along any side of the keyboard, and keypads will adjust to extend no further than the edge of the keyboard.

Instead of the keyboard layout of FIG. 9, a QWERTY layout could be used, in which case the ABC sequential alphabet layout is exchanged for the QWERTY layout. In other embodiments, the AZERTY keyboard may be used, or the Dvorak keyboard, for example.

Figure 10:
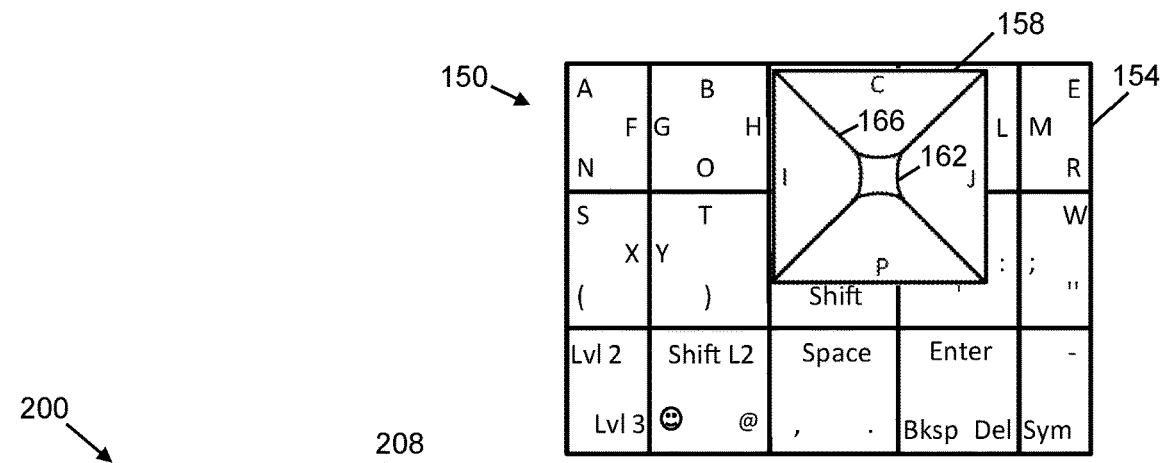
FIG. 10 is a drawing representing another keyboard with a keypad selected, according to an embodiment of the present invention.

Referring to FIG. 10, there is shown a keyboard 150 with 15 different group keys 154. The keypad 158 is created after the user touches a corresponding group key with 4 characters on the keyboard 150. The keypad 158 has a dead zone 162 in its centre, the dead zone being square with concave sides. The keypad 158 has 4 keys arranged in such a way that the boundaries between keys are aligned along the diagonals 166 of the keypad 158.

Figure 11:
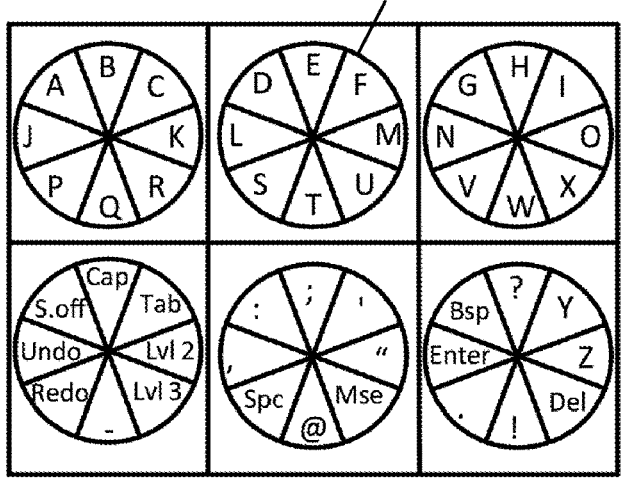
FIG. 11 is a drawing representing another keyboard, according to an embodiment of the present invention.

Referring to FIG. 11, there is shown a keyboard 200 with 6 different group keys. Each group key has 8 functions. The group key 208 has its functions arranged in a circle or pie-shape with 8 sections or keys. Each key has a symbol displayed within it. For additional keys beyond the 48, additional levels of the keyboard 200 are available. Since this example of a combination of 6 designated areas each having 8 keys each allows a total of 48 keys on the keyboard 200, additional keys engaging different characters, values, or functions are accessed by shifting to additional levels of the keyboard, each additional level having another 48 keys. By this method, the number of keys available on an electronic keyboard becomes, for many intents and purposes, effectively unlimited.

Figure 12:
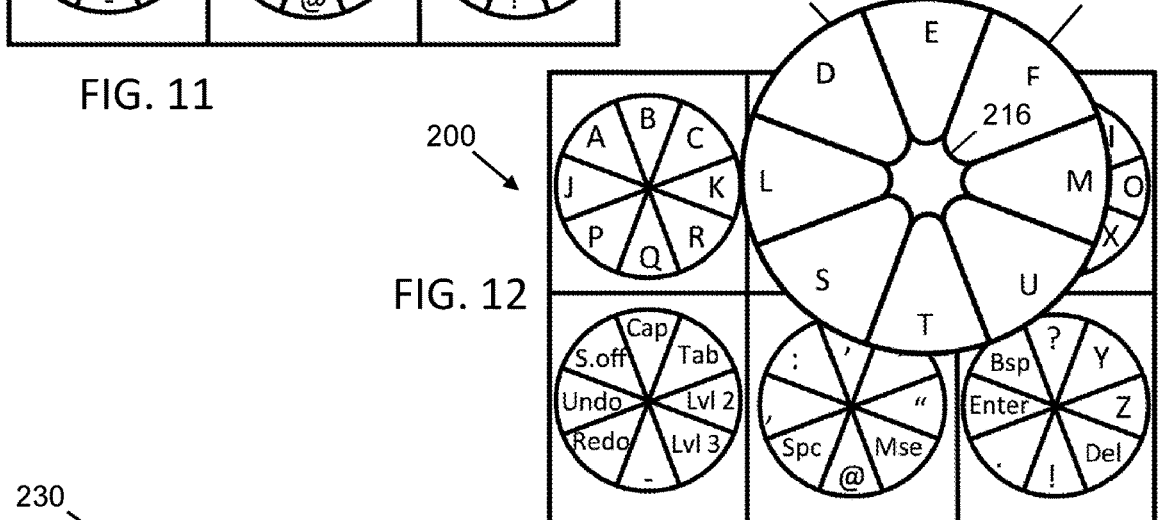
FIG. 12 is a drawing representing the keyboard of FIG. 11 with a keypad selected, according to another embodiment of the present invention.

Referring to FIG. 12, there is shown the keyboard 200 as in FIG. 11 with a keypad 212. The keypad 212 is created after the user touches a group key 208 on the keyboard, and has a dead zone 216 in its centre. The dead zone 216 is octagonal, with concave sides. The keypad has 8 keys such as key 220.

Figure 13:
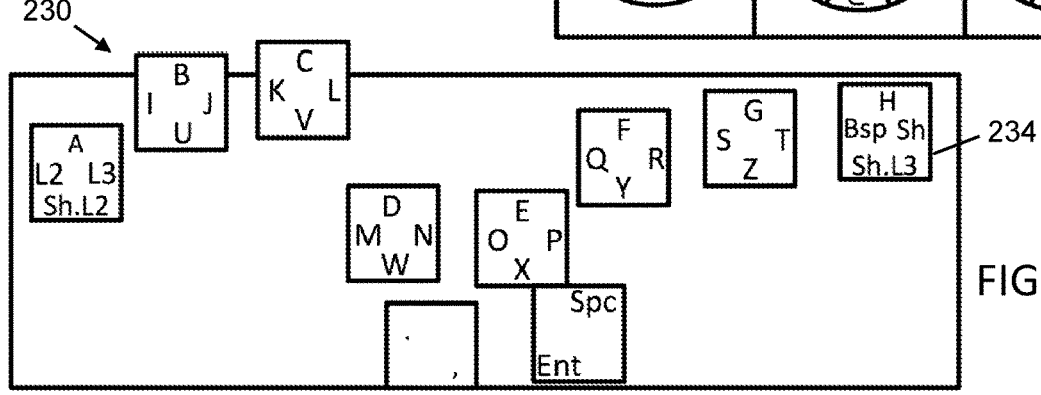
FIG. 13 is a drawing representing a keyboard with a custom series of group keys, according to another embodiment of the present invention.

Referring to FIG. 13, there is shown a keyboard 230 with 10 group keys such as group key 234. Each group key has 2 or more symbols. In some embodiments, the user initiates the display of the 10 group keys 234 when he touches the keyboard 230 on a touchscreen with his 10 fingers. The ten touches may or may not be simultaneous. Each group key 234 is intended to be used by a different finger of the user. When a group key 234 is touched, it becomes a keypad, for example similar to keypad 158 (FIG. 10). In one embodiment of this claimed method, a user can create a custom 10-finger keyboard layout by touching 10 fingers on the touchscreen, each finger in the location where the user would like the key corresponding to that finger to be located. To perfect the 10-finger layout, the user can make final adjustments by dragging the ten group keys 234 into the precise location desired. This claimed method will accommodate people with particularized capabilities with respect to their hand use, as well as accommodating hands of various shapes and sizes. In some embodiments the user is presented with a fixed ten finger group key layout, wherein the final position of keys may still be adjusted by dragging the keys to the user's preferred location.

Figure 14:
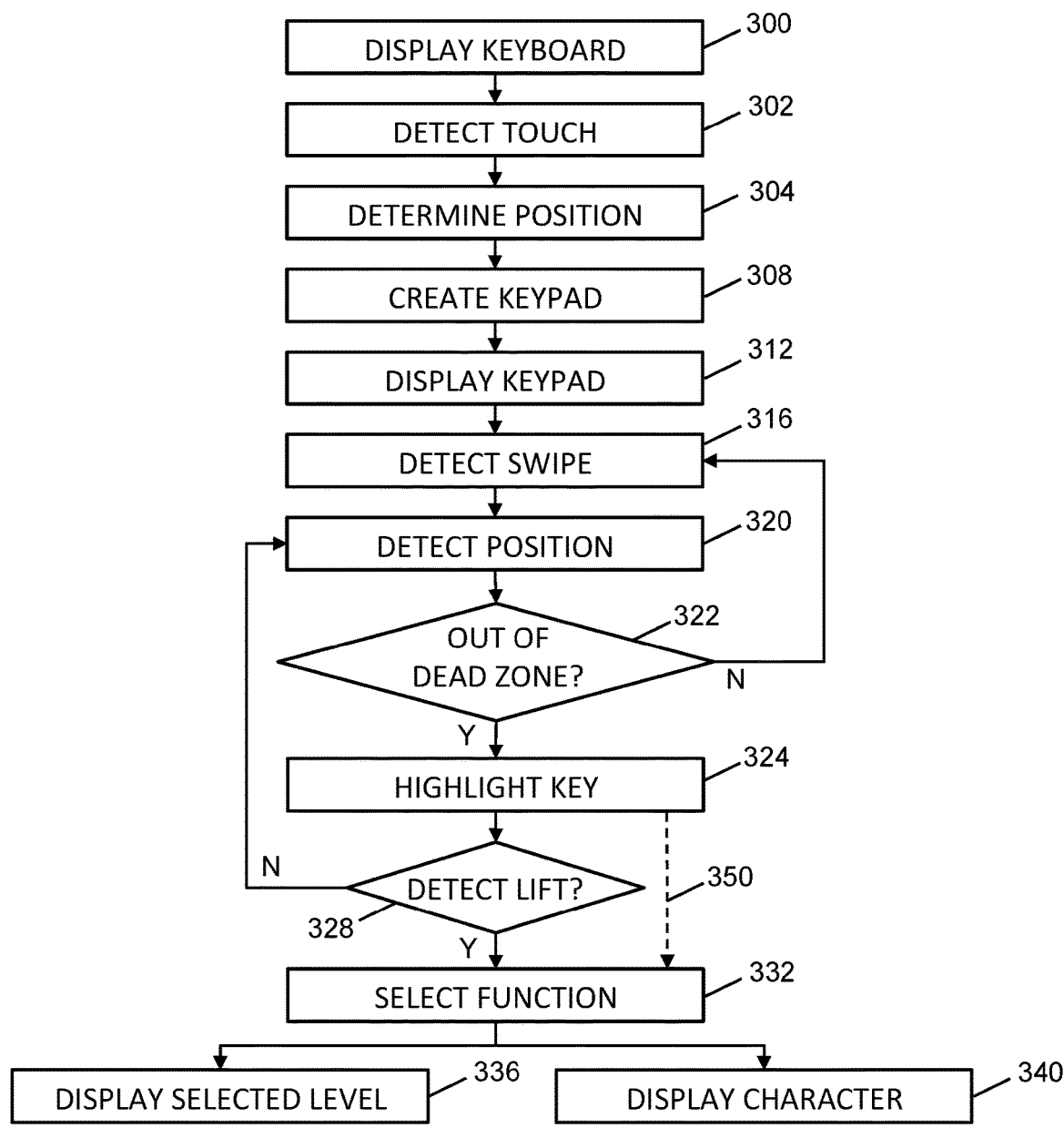
FIG. 14 is a flowchart describing the functioning steps of a keyboard, according to embodiments of the present invention.

Referring to FIG. 14, there is shown an exemplary process that a system (or device) with a touchscreen keyboard follows. The system hosting the touchscreen displays the keyboard on the touchscreen in step 300. Then, the system detects a touch from the user's fingertip in step 302. The system determines, in step 304, the position of the touch on the keyboard. After that, the system creates a keypad assigned to a group of functions and centered on the location of the user's touch on the keyboard, in step 308. Creation of the keypad involves activating an area of the touchscreen so that a subsequent swipe to a sub-area within it, i.e. a key, will trigger the function corresponding to the sub-area.

The system displays the keypad on the keyboard in step 312. Then the system detects a swipe from the user's fingertip on the touchscreen, on the keypad, in step 316. In step 320, the system detects the position of the user's touch at the end of the swipe. In step 322, the system assesses whether the user's touch is outside or not of the dead zone. If the touch is still inside the dead zone, the system goes back to detect a further swipe in step 316. If the touch is outside the dead zone, the system then highlights, in step 324, the key in which the swipe terminates. In step 328, the system detects whether the user has lifted has finger touch off the touchscreen. If the system does not detect the lift of the touch, the system goes back to step 320. If the system detects a lift of the user's touch, then the system selects the function corresponding to the key in step 332. The function selected may be, for example, to change the level of the keyboard. If this is the case, the system displays the selected level in step 336. In another case, the function may be the registration of a character in an input field, in which case the system displays the character in step 340.

In an option, the function corresponding to a key may be implemented upon the swipe immediately reaching the key. This may be implemented, for example, by configuring the keyboard to detect when the touch reaches the boundary between the dead zone and the key. This mode of operation may allow for faster typing than waiting until a lift of the touch is detected. In this case, step 328 is omitted, and the process passes from step 324, in which the key is highlighted, via dashed line 350 to step 332, in which the function is selected. In some embodiments, step 324 may also be omitted.

Figure 15:
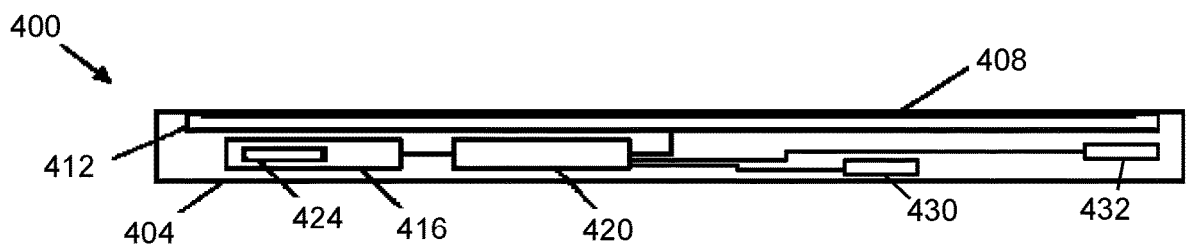
FIG. 15 is a schematic side cutaway view of an electronic device with a keyboard on a touchscreen, according to an embodiment of the present invention.

Referring to FIG. 15, an exemplary embodiment of an electronic device 400 is shown that includes a platform 404 having a touchscreen keyboard 408 displayed on a touchscreen 412. The electronic device 400 also includes a memory 416 and one or more processors 420 connected to the memory 416 and to the touchscreen 412. Computer readable instructions 424 are stored in the memory 416 and processed by the processor(s) 420 in order to control the touchscreen keyboard 408 and if necessary any other output of the touchscreen 412. The processor(s) 420, by reading the computer readable instructions 424, are also responsible for interpreting any finger touch inputs received at the keyboard 408 displayed on the touchscreen 412. The memory 416 may in part or in whole be located within the processor(s) 420. Also present in the device 400 is a vibrator 430 connected to the processor(s) 420, for outputting a haptic signal. Also present in the device 400 is a speaker 432 connected to the processor(s) 420, for outputting an audio signal. Examples of electronic devices 400 that can be configured for the keyboard 408 on a touchscreen 412 include tablets, mobile phones, laptops, household appliances and other electronic equipment. Peripheral touchscreens 412, including purpose-built touchscreens that plug into desktops, laptops and other electronic equipment may also be included. Program coding for the computer readable instructions 424 may be achieved using known programming languages.

C. Variations

In some embodiments, any application that requires data entry by means of touchscreens may benefit from the keyboard presently disclosed, including without limitation vehicle dashboard screens, gaming apparatuses, equipment controls, televisions, radios, sound systems, mobile communications devices including cellular telephones, and other electronic devices including wired-in phones, tablets, laptop and desktop computers. The keyboard could be used in conjunction with voice-to-text or other eyes free accessibility technology in any application in some embodiments The keyboard, in some embodiments, also includes a feature where the non-visual, "eyes-free" nature of the invention is augmented by audio and/or haptic indicators, which confirm both when a desired group key has been selected at the beginning of a directional swipe, and then too when the desired key has been selected at the end of a directional swipe. When a smooth-surfaced touchscreen is divided into designated areas, or group keys, each of those areas when touched emits a haptic vibration distinctive from the haptic vibration associated with a neighbouring area of the screen, along with a non-verbal audio indication, and/or audible voice identification of the group key selected. In some embodiments, the haptic vibration may be unique to each group key. Similarly, when an individual key is then reached in the course of a directional swipe, an audible voice identifies that key by name, and/or by haptic vibration, and a non-verbal indicator sounds. The haptic and/or audio indicators may be triggered when the user' touch arrives on the intended key, when the person's fingertip is lifted from the selected key, or both on arriving on the key and lifting therefrom. These haptic and audio indicators may also be independently turned off by a user or customized. Haptic and/or audio indicators may also be triggered when a keyboard becomes active, for example when it is not displayed, so that a user may know when to begin "eyes-free" typing. Again, the haptic and/or audio indicators may be triggered when the keyboard becomes inactive or when it is switched off. If a user selects an incorrect key, and then slides his touch over to the correct key, each key touched may trigger a verbal audio indicator that recites the name of the key. In some embodiments, a variety of colour and light indicators may display upon the successful completion of particular functions, such as the engagement of a group key or an individual key.

In the keyboard mode in which a function is registered upon the lift of a touch, then the touch may be slid over more than one group key without lifting the finger, in which case none of the intervening keys will register. Audio indicators or haptic indicators may be provided to indicate to the user that different group keys are being swiped over. A key may finally be registered when the user's swipe reaches the desired key and the finger is lifted. Or, no key will register if the user's swipe terminates on a dead zone of any keypad.

In some embodiments, a touchscreen could have only one designated area having one group key for multiple functions, and multiple levels could be employed. In some embodiments, a touchscreen could be divided into 2 designated areas, each having a group key for multiple functions, and multiple levels could be employed. The same pattern could be followed, such that a touchscreen could be divided into as many designated areas as practicable according to the size and purpose of the touchscreen, each designated area having a group key for as many functions as practicable for the application, and the keyboard employing as many levels as desired, level changes being made for either one or more select group keys at a time, or for all group keys on the touchscreen at once. Another embodiment could have 15 designated areas, each having a group key with 4 functions associated with it. Another embodiment could have 10 designated areas each with a group key that has a variable number of functions associated with it. There could be numerous other combinations of group keys and functions. Each of the group keys could have any number of keys grouped in it, including keys having the function of displaying a further group key, or a further key pad.

The keyboard described herein allows a layout of symbols, characters, values and functions in commonly understood patterns. Letters can be laid out alphabetically for example. Words on the exemplary keyboards may be replaced with symbols and other abbreviations may be used instead of those shown. The keyboard also includes a method allowing users to adopt their own most logical key layout, by customizing the symbols, characters, values or functions associated with individual keys, by changing the positions of existing key symbols, values and functions, or by adopting alternative symbols, values or functions from a list provided, or by importing unlisted alternatives by means of an ASCII code or from other electronic sources known to a user including from existing non-Latin keyboards. Any customized keys or whole keyboards created by a user may also be named and saved by a user, or deleted or re-set to defaults. Different sizes and numbers of groups keys may be chosen by the user, and different keyboard levels may be chosen. Predictive text may be customized by the user.

In some embodiments, the keyboard may not be displayed, while the touchscreen is still active and able to detect keyboard inputs from a user. For example, an image or other data may be displayed over a majority of the touchscreen, and the touch-sensitive areas of the keyboard may partly or fully coincide with a non-keyboard display on the touchscreen. Or, the keyboard could be displayed remotely in one or more locations or in a network of devices in some embodiments.

Optionally, the keys may be activated by tapping instead of swiping. In this case, the keyboard has a mode in which the group keys do not act as group keys, but instead the sections within the group keys each act as individual keys. The user, in this case, will have the option of switching between modes.

Optionally, the keys may be activated by a non-human touch, such as by a glove worn by a person, or by a stylus to which the touchscreen is sensitive.

Different swipe distances may be employed. For example, swipes as small as 1 mm may be enough to register a key in some embodiments, and swipes as large as 1 cm may be utilized in other embodiments. Swipe distances outside the range defined by the values herein may also be employed.

Throughout the description, specific details have been set forth in order to provide a more thorough understanding of the invention. However, the invention may be practiced without these particulars. In other instances, well known elements have not been shown or described in detail and repetitions of steps and features have been omitted to avoid unnecessarily obscuring the invention. Accordingly, the specification and drawings are to be regarded in an illustrative, rather than a restrictive sense.

It will be clear to one having skill in the art that further variations to the specific details disclosed herein can be made, resulting in other embodiments that are within the scope of the invention disclosed. Some steps in the flowchart may be performed in a different order, other steps may be added, or one or more steps may be removed without altering the main outcome of the process. All parameters, dimensions, proportions, and configurations described herein are examples only and may be changed depending on the specific embodiment. Accordingly, the scope of the invention is to be construed in accordance with the substance defined by the following claims.

The invention claimed is:

1. A touchscreen configured to:
   define a keyboard on the touchscreen;
   define a group key within the keyboard, wherein the group key represents multiple functions;
   detect a touch on the touchscreen within the group key;
   define a keypad on the touchscreen, the keypad comprising a dead zone at a point of the touch and keys adjacent to the dead zone, each key corresponding to a different one of the functions;
   detect a swipe of the touch from the dead zone to one of the keys; and
   perform the function corresponding to said one key.

2. The touchscreen of claim 1, wherein the dead zone is centered at the point of touch.

3. The touchscreen of claim 1, wherein the keypad is located differently from a location of the group key, at a location centered at the point of the touch.

4. The touchscreen of claim 1, wherein the point of touch is anywhere within the group key.

5. The touchscreen of claim 1, wherein the touch is a fingertip touch.

6. The touchscreen of claim 1, further configured to perform the function corresponding to said one key in response to detecting a lift of the touch after the swipe.

7. The touchscreen of claim 1, further configured to perform the function corresponding to said one key immediately in response to detecting the swipe reaching said one key.

8. The touchscreen of claim 1, wherein a shortest distance from a centre of the dead zone to any of the keys is less than a shortest distance from the centre of the dead zone to a boundary between two of the keys.

9. The touchscreen of claim 1, wherein a shortest distance from the point of the touch to any of the keys is less than a shortest distance from the point of the touch to a boundary between two of the keys.

10. The touchscreen of claim 1, wherein the dead zone has one or more concave edges each adjacent to a different one of the keys.

11. The touchscreen of claim 1, wherein the dead zone has a form of a gear-shaped cogwheel, wherein each cog of the cogwheel extends between an adjacent two of the keys.

12. The touchscreen of claim 1, wherein the keys are arrayed around the dead zone.

13. The touchscreen of claim 1, wherein the dead zone is circular.

14. The touchscreen of claim 1, wherein the dead zone has a size that is customizable by a user of the keyboard.

15. The touchscreen of claim 1, wherein the functions are customizable by a user of the keyboard.

16. The touchscreen of claim 1, comprising multiple levels, wherein at least one level is customizable by a user of the keyboard.

17. The touchscreen of claim 1, comprising multiple levels, wherein a number of levels are customizable by a user of the keyboard.

18. The touchscreen of claim 1, wherein the group key or the keyboard is displayed on the touchscreen.

19. The touchscreen of claim 1, wherein the keypad is displayed on the touchscreen.

20. The touchscreen of claim 1, wherein the swipe is via another key for which the corresponding function is not performed.

21. The touchscreen of claim 1, wherein:
   the touch is a result of a prior swipe from another group key that represents multiple other functions; and
   none of the other functions are performed.

22. The touchscreen of claim 1, configured to operate in a mode in which each of the functions can be selected by tapping on a corresponding area within the group key.

23. The touchscreen of claim 1, wherein the keypad is larger or smaller than the group key.

24. The touchscreen of claim 1, further configured to:
   detect a swipe of the touch back to the dead zone;
   detect another swipe of the touch from the dead zone to another of the keys; and
   perform the function corresponding to the other key.

25. The touchscreen of claim 1, wherein the function comprises displaying a further keypad on the touchscreen.

26. The touchscreen of claim 1, wherein the function comprises displaying a further group key on the touchscreen.

27. The touchscreen of claim 1, comprising nine further group keys, the touchscreen configured to define positions on the keyboard for all of the group keys in response to detecting ten touches, each position corresponding to a location of a different one of the touches.

28. The touchscreen of claim 27, configured to adjust the position of one or more of the group keys in response to detecting a drag, by a user of the keyboard, of said one or more of the group keys to a different location or locations on the screen.

29. The touchscreen of claim 1, wherein:
   the group key is displayed on the touchscreen and comprises a plurality of symbols each representing a different one of the functions;
   the keypad is displayed on the touchscreen and comprises the plurality of symbols; and
   the keypad is centered at a centre of the group key or at a different location to the centre of the group key.

30. The touchscreen of claim 29, wherein the keypad exceeds a perimeter of the keyboard.

31. The touchscreen of claim 29, wherein the keypad does not exceed a perimeter of the keyboard.

32. An electronic device comprising:
   a touchscreen;
   a memory storing computer readable instructions;
   and a processor connected to the memory and the touchscreen;
   said computer readable instructions configured, upon processing by said processor, to cause the device to: define a keyboard on the touchscreen;
   define a group key within the keyboard, wherein the group key represents multiple functions;
   detect a touch on the touchscreen within the group key;
   define a keypad on the touchscreen, the keypad comprising a dead zone at the point of the touch and keys adjacent to the dead zone, each key corresponding to a different one of the functions;
   detect a swipe of the touch from the dead zone to one of the keys; and perform the function corresponding to said one key.

33. The electronic device of claim 32, wherein the keys are arrayed around the dead zone.

34. The electronic device of claim 32, further configured to perform said function corresponding to said one key in response to detecting a lift of the touch after the swipe.

35. The electronic device of claim 32, further configured to perform said function corresponding to said one key immediately in response to detecting the swipe first reaching said one key.

36. The electronic device of claim 32, wherein the group key is displayed on the touchscreen.

37. The electronic device of claim 32, wherein the keypad is displayed on the touchscreen.

38. The electronic device of claim 32, wherein the function comprises displaying a further keypad on the touchscreen.

39. The electronic device of claim 32, wherein the function comprises displaying a further group key on the touchscreen.

40. The electronic device of claim 32 wherein the computer readable instructions are configured, in response to detecting the touch, to cause the device to emit a haptic vibration, a non-verbal audio indicator, a verbal audio indicator, or a combination selected therefrom.

41. The electronic device of claim 40, wherein the computer readable instructions are configured to allow a user of the keyboard to turn off any of the haptic vibration, the non-verbal audio indicator and the verbal audio indicator.

42. The electronic device of claim 32, wherein the computer readable instructions are configured, in response to detecting the swipe, to cause the device to emit a haptic vibration, a non-verbal audio indicator, a verbal audio indicator, or a combination selected therefrom.

43. The electronic device of claim 42, wherein the computer readable instructions are configured to allow a user of the keyboard to turn off any of the haptic vibration, the non-verbal audio indicator and the verbal audio indicator.

44. A method for receiving an input to a touchscreen, the method comprising:
    defining, by a processor, a keyboard on the touchscreen;
    defining, by the processor, a group key within the keyboard, wherein the group key represents multiple functions;
    detecting, by the processor, a touch on the touchscreen within the group key;
    defining, by the processor, a keypad on the touchscreen, the keypad comprising a dead zone at a point of the touch and keys adjacent to the dead zone, each key corresponding to a different one of the functions;
    detecting, by the processor, a swipe of the touch from the dead zone to one of the keys; and
    performing, by the processor, the function corresponding to said one key.

45. The method of claim 44, wherein the keys are arrayed around the dead zone.

46. The method of claim 44 comprising, after detecting the swipe and prior to the performing step:
    detecting, by the processor, a lift of the swipe.

47. The method of claim 44, comprising receiving, by the processor, an input from a user of the keyboard to customize a shape of the group key, a position of the group key, a symbol displayed within the group key, a number of functions that are represented by the group key, a size of the group key, a shape of the keypad, a size of the keypad, a number of symbols displayed within the keypad, a size of the dead zone, a shape of the dead zone, a level of the keyboard, a language of the keyboard, alternative symbols or functions of the keyboard, an audio indicator related to the keyboard, a haptic indicator related to the keyboard, predictive text, or any combination selected therefrom.

48. The method of claim 44, wherein:
    the point of touch is anywhere within the group key; and
    the dead zone is centered at the point of touch.

49. The method of claim 44, wherein a shortest distance from a centre of the dead zone to any of the keys is less than a shortest distance from the centre of the dead zone to a boundary between two of the keys.

50. The method of claim 44, wherein a shortest distance from the point of the touch to any of the keys is less than a shortest distance from the point of the touch to a boundary between two of the keys.

51. The method of claim 44, wherein the group key is displayed on the touchscreen.

52. The method of claim 44, wherein the keypad is displayed on the touchscreen.

53. The method of claim 44, wherein the function comprises displaying a further keypad on the touchscreen.

54. The method of claim 44, wherein the function comprises displaying a further group key on the touchscreen.

* * * * *